United States Patent [19]
Smith

[11] 4,169,623
[45] Oct. 2, 1979

[54] HAND RAILS EXTENSIBLY MOUNTED IN GUIDE TUBES AT THE REAR OF A VAN OR TRAILER

[76] Inventor: James B. Smith, 1193 Arch Ct., Concord, Calif. 94520

[21] Appl. No.: 866,489

[22] Filed: Jan. 3, 1978

[51] Int. Cl.² ............................................. B62D 39/00
[52] U.S. Cl. ..................................... 296/1 C; 296/71; 280/762; 105/461
[58] Field of Search ........................... 296/43, 71, 1 C; 280/762; 105/389, 460, 461

[56] References Cited
U.S. PATENT DOCUMENTS

| | | | |
|---|---|---|---|
| 1,268,209 | 6/1918 | Brady | 105/461 |
| 1,670,928 | 5/1928 | Marello | 105/389 |

*Primary Examiner*—Richard A. Bertsch
*Attorney, Agent, or Firm*—William R. Piper

[57] ABSTRACT

Extensible hand rails are adjustably mounted in vertical guide tubes positioned at the rear of a van or trailer. These hand rails may be moved into retracted positions and held in this position so that the tops of the hand rails will lie flush with the floor of the vehicle. Spring means is used for moving the hand rails into extended or operative position to act as guards and the hand rails may be secured in their operative or extended position.

2 Claims, 4 Drawing Figures

U.S. Patent  Oct. 2, 1979  4,169,623
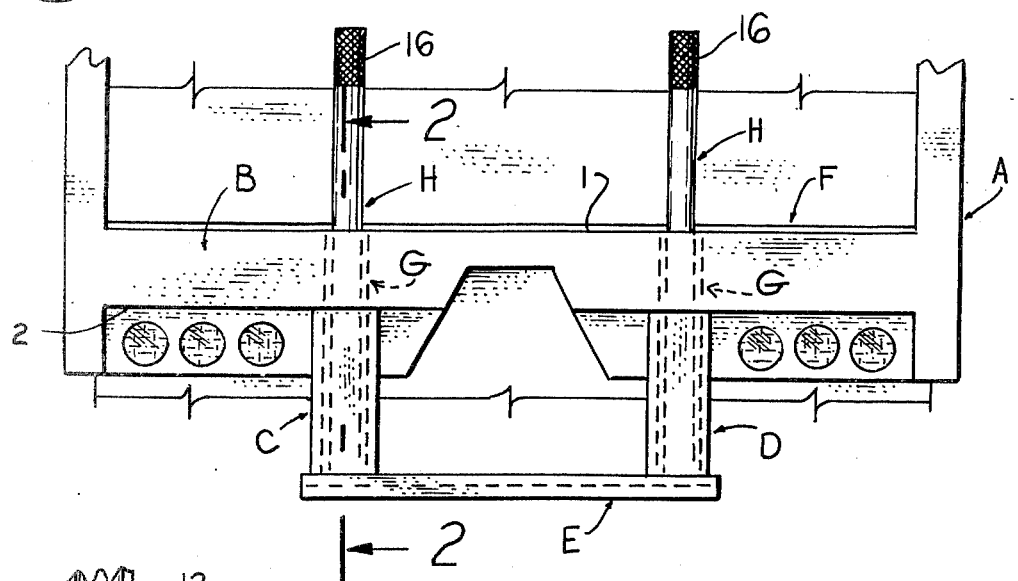
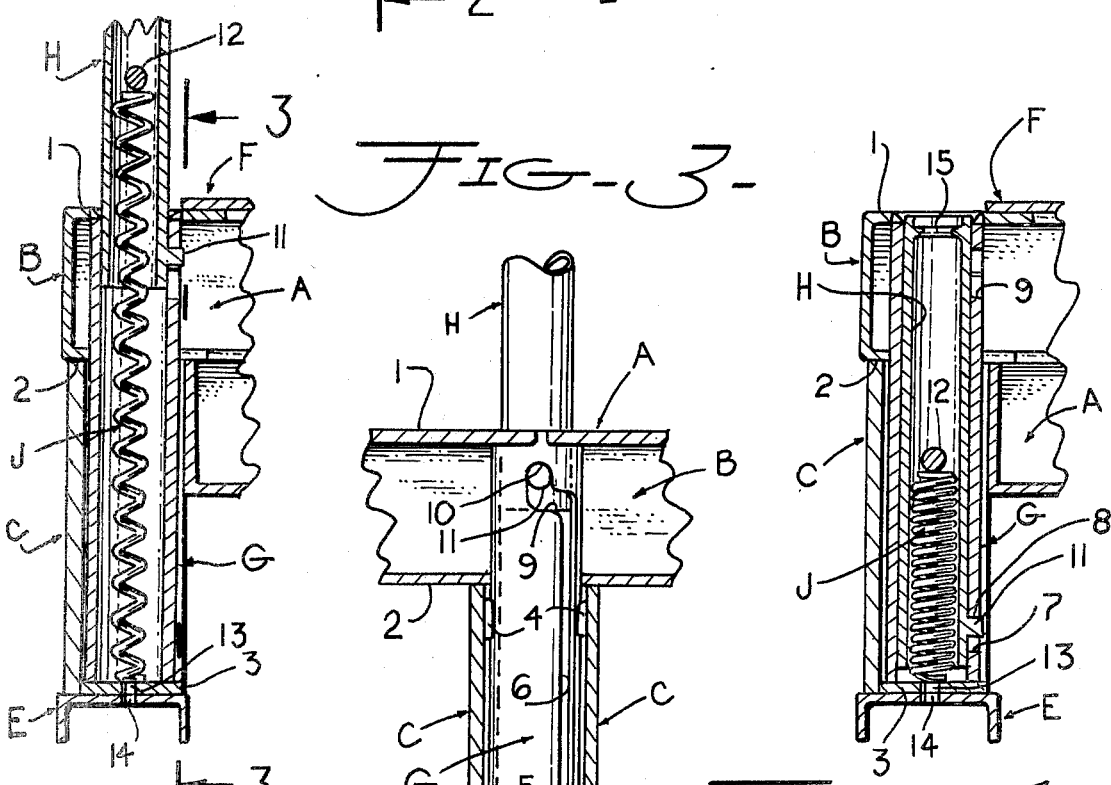

HAND RAILS EXTENSIBLY MOUNTED IN GUIDE TUBES AT THE REAR OF A VAN OR TRAILER

SUMMARY OF THE INVENTION

When the rear end of a van or trailer is open, it is very easy for a person who is moving bulk items on or off the vehicle to step rearwardly when he is near the vehicle rear end and not realize that he has stepped off into space and will drop to the pavement below. Many accidents happen in this manner and some of them are serious.

An object of my invention is to provide extensible hand rails which may be quickly moved from an inoperative position where their tops lie flush with the floor of the vehicle into extended or operative position where a person can grasp these hand rails in getting on or off the vehicle and where the hand rails will act as guards to prevent the accidental stepping off of a person from the rear of the vehicle.

A further object of my invention is to make use of the structure at the rear end of a vehicle and mount guide tubes in certain portions of this structure where they will be substantially hidden from view. Then the hand rails are slidably mounted in these guide tubes and when the hand rails are in retracted or inoperative position, they will be hidden from view because the tops of the hand rails will lie flush with the floor of the vehicle.

BRIEF DESCRIPTION OF THE DRAWING

FIG. 1 is a rear elevation of a van or trailer and shows the hand rails in raised or operative position.

FIG. 2 is an enlarged vertical section taken along the line 2—2 of FIG. 1 and shows the hand rail with its lower portion in the guide tube and secured in place to prevent further movement of the hand rail in either direction.

FIG. 3 is a section taken along the line 3—3 of FIG. 2 and shows the bayonet slot in the guide tube which cooperates with a projection on the hand rail for securing the hand rail from movement when it is either in operative or inoperative position.

FIG. 4 is a view similar to FIG. 2, except that the hand rail is now secured in inoperative position and the top of the hand rail will lie flush with the floor of the vehicle.

DESCRIPTION OF THE PREFERRED EMBODIMENT

In carrying out my invention, I make use of a vehicle A and show the rear end of the vehicle in FIG. 1. A channel B, extends across the rear end and the upper and lower sides 1 and 2 of this channel are shown in section in FIGS. 2, 3 and 4 and face forwardly toward the front end of the vehicle. Vertical channels C and D, extend downwardly from the rear cross channel B, and have their upper ends welded to the undersurface of the lower side 2 of the channel B. A short channel E, is welded to the bottoms of the vertical channels C and D, and the sides of this channel force downwardly as shown in FIGS. 2 and 4. This channel E, functions as a rear bumper. A floor board F, extends forwardly from the cross channel B, and is supported thereby. The parts thus far described are standard construction for one type of vehicle and form no part of my invention except insofar with the parts now to be described.

The two sides of each vertical channel C and D, face forwardly and I mount a guide tube in each one. Since both guide tubes are identical to each other, I will describe only one of them in detail. Each guide tube G, is housed within its vertical channel C and D, and the top of the guide tube lies flush with the upper side 1 of the rear cross channel B, see FIGS. 2 and 4. The bottom of each guide tube rests on a plate 3 which is received within the vertical channel and is welded to the horizontal channel E, and to the bottom of the guide tube G. Also, the guide tube is welded to its vertical channel at spots 4 and 5, as shown in FIGS. 2, 3 and 4.

FIG. 3 shows the guide tube G, provided with a vertical slot 6. The lower end of the slot 6 has a right angle turn in it at 7 and with an upwardly turned recess 8 at the extreme end of the right angle turn. At the upper end of the slot 6 in the guide tube G, there is also a right angle bend in the slot at 9 so that the slot portion 9 parallels the slot portion 7. The portion 9 of the slot 6 ends in an upwardly recess 10.

A hollow cylindrical hand rail H, is slidably mounted in each guide tube G and it has an outwardly extending projection 11, near its lower end that is slidably received in the slot 6 in the guide tube, see FIGS. 2, 3 and 4. A compression spring J, has its upper end received within the lower portion of the hollow hand rail H, with the upper end bearing against a rod 12 that extends diammetrically across the hand rail as is clearly shown in FIG. 2. The lower end of the compression spring J rests on the plate 3 and this plate has a central drain hole 13 that registers with a drain hole 14 in the channel E for draining any water out from the interiors of the hand rail H, and the guide tube G. In FIG. 4 I show a diammetrically extending hand grip rod 15, mounted near the top and in the hollow interior of the hand rail. The compression spring J, yieldingly urges the hand rail in an upward direction at all times. FIG. 4 shows the hand rail in retracted or inoperative position where the projection 11 is received in the recess 8 and the top of the hand rail H, lies flush with the top of the rear channel B. The operator can move the hand rails H, into operative position by grasping the hand grip 15 and pushing downwardly to move the projection 8 out from the recess 8 and into the horizontal slot portion 7. Then the operator turns the hand grip 15 to rotate the hand rail H so that the projection 11 is moved along the slot portion 7 until the projection is brought into alignment with the vertical slot portion 6. At this point the compression coil spring J will move the hand rail upwardly until the projection 8 aligns with the horizontal slot portion 9. The operator now rotates the hand rail so that the projection 11 will travel along the slot portion 9 until the projection reaches the slot recess 10. At this point the spring J will move the hand rail upwardly so that the recess 10 will receive the projection. The spring J will yieldingly hold the hand rail in its uppermost position. The top outer portion of each hand rail is knurled as shown at 16 in FIG. 1.

From the foregoing description of the various parts of the device the operation thereof will be readily understood. The hand rails H, when in retracted position are completely concealed within the guide tubes G, which in turn are housed within the vertical channels C. When the hand rails H, are in extended or operative position, they will appear as shown in FIG. 1 and will act as guards to prevent the accidental falling of an operator from off the rear end of the vehicle.

I claim:

1. A vehicle having a body with a flat horizontal upper surface and an unobstructed open rear end;
   (a) a laterally extending horizontal member positioned at the rear end of said body whose upper surface lies in the same plane as the upper surface of the vehicle body;
   (b) vertical guide tubes depending from said horizontal member and spaced laterally from each other and having their tops lying flush with the upper surfaces of said member and the flat surface of said body;
   (c) vertical hand rails slidably mounted in said guide tubes and having their tops lying flush with the tops of said guide tubes when said hand rails are in retracted position so as to offer no obstruction to the rear, open end of the body, said hand rails being movable into operative position to have the greater portions of their lengths extending above the upper surface of the body; and
   (d) means for securing said hand rails in extended position.

2. The combination as set forth in claim 1: and in which
   (a) each guide tube has a vertical slot therein with the top and lower end of the slot having a portion extending substantially at right angles to the length of the slot;
   (b) each hand rail having an outwardly extending projection slidable in its associate slot and being receivable in the lower right angle portion of the slot for securing said hand rail in inoperative position so that its top lies flush with the body upper surface; and
   (c) a coil spring mounted in each guide tube and having its upper end received in the interior of the associate hollow hand rail and connected thereto for yieldingly urging the hand rail into extended position so that the projection can enter the upper right angle portion, the top of each hollow hand rail having a hand grip extending diammetrically thereacross.

* * * * *